(12) United States Patent
Fox, Jr.

(10) Patent No.: US 11,072,430 B2
(45) Date of Patent: Jul. 27, 2021

(54) RING RELEASE SYSTEMS AND METHODS

(71) Applicant: Roy L. Fox, Jr., Belleville, WV (US)

(72) Inventor: Roy L. Fox, Jr., Belleville, WV (US)

(*) Notice: Subject to any disclaimer, the term of this patent is extended or adjusted under 35 U.S.C. 154(b) by 0 days.

(21) Appl. No.: 16/998,254

(22) Filed: Aug. 20, 2020

(65) Prior Publication Data

US 2021/0061480 A1 Mar. 4, 2021

Related U.S. Application Data

(60) Provisional application No. 62/891,770, filed on Aug. 26, 2019.

(51) Int. Cl.
*B64D 17/38* (2006.01)
*F16B 5/06* (2006.01)
*F16G 11/10* (2006.01)

(52) U.S. Cl.
CPC .......... *B64D 17/386* (2013.01); *F16B 5/0621* (2013.01); *F16G 11/10* (2013.01)

(58) Field of Classification Search
CPC ....... F16G 11/10; B64D 17/386; B64D 17/54; B64D 17/62; B64D 17/76; B64D 1/12
See application file for complete search history.

(56) References Cited

U.S. PATENT DOCUMENTS

| | | | |
|---|---|---|---|
| 6,983,913 B2* | 1/2006 | Auvray | B64D 17/38 244/151 A |
| 9,676,487 B1* | 6/2017 | Fox, Jr. | B64D 17/38 |
| 2004/0050343 A1* | 3/2004 | Kurtgis | B64D 1/12 119/710 |
| 2004/0219812 A1* | 11/2004 | Marmaropoulos | H01R 13/6271 439/180 |
| 2017/0252621 A1* | 9/2017 | Ross | A63B 69/0059 |

* cited by examiner

*Primary Examiner* — Assres H Woldemaryam
(74) *Attorney, Agent, or Firm* — Snell & Wilmer L.L.P.

(57) ABSTRACT

A ring release system is configured to releasably couple a parachute to a payload. The ring release system may comprise a series of release rings affixed to a riser. At least one release ring has an associated retaining ring that surrounds the riser and is affixed to the riser on a back side. The retaining ring prevents stitching securing the release ring from being placed in peel when under stress, improving the reliability of the ring release system.

9 Claims, 14 Drawing Sheets

Front view

FIG. 1
(prior art)

Rear view

ND METHODS

CROSS-REFERENCE TO RELATED APPLICATIONS

This application claims priority to and the benefit of U.S. Provisional Application No. 62/891,770 filed on Aug. 26, 2019 entitled "Ring Release Systems and Methods." The foregoing application is hereby incorporated by reference in its entirety (except for any subject matter disclaimers or disavowals, and except to the extent of any conflict with the disclosure of the present application, in which case the disclosure of the present application shall control).

TECHNICAL FIELD

The present disclosure relates to ring-based release systems, and particularly to systems and methods for releasing parachutes from payloads.

BACKGROUND

When a personnel parachute malfunctions, a common recovery protocol is to release the failed chute from the parachutist and deploy a reserve chute. One prior release system utilized for this purpose is a 3-ring release system, for example as disclosed by Booth (U.S. Pat. No. 4,337,913) or Auvray (U.S. Pat. No. 6,983,913). However, these and other prior ring release systems suffer from various deficiencies. More generally, a variety of situations may arise where two coupled objects may desirably be released from one another. Accordingly, improved release systems and methods of use thereof are desirable.

SUMMARY

A ring release system and methods for use of the same are provided. In an exemplary embodiment a ring release system comprises a riser comprising webbing, the riser having a top and a bottom; a first release ring coupled to the riser via a first front webbing stitched to a first side of the riser; a first retaining ring having the riser and the first front webbing passed therethrough, the first retaining ring being coupled to the riser via a first back webbing stitched to a second side of the riser opposite the first side; and a second release ring coupled to the riser via a second front webbing stitched to the first side of the riser.

In another exemplary embodiment, a method of separating a payload from a parachute comprises: coupling the parachute to the payload via a ring release system; and activating a cutter in the ring release system to separate the payload from the parachute. The ring release system couples the parachute and the payload, and the ring release system comprises: a riser comprising webbing, the riser having a top and a bottom; a first release ring coupled to the riser via a first front webbing stitched to a first side of the riser; a first retaining ring having the riser and the first front webbing passed therethrough, the first retaining ring being coupled to the riser via a first back webbing stitched to a second side of the riser opposite the first side; and a second release ring coupled to the riser via a second front webbing stitched to the first side of the riser. The contents of this summary section are provided only as a simplified introduction to the disclosure and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for release systems, parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical ring release system and/or related methods of use.

Principles of the present disclosure may be compatible with and/or may be utilized in connection with principles disclosed in U.S. Pat. No. 9,676,487 entitled "RING RELEASE SYSTEMS AND METHODS" and U.S. Pat. No. 9,789,968 entitled "RING RELEASE SYSTEMS AND METHODS", each to Fox. The disclosures of all the foregoing patents are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

Figure 1:
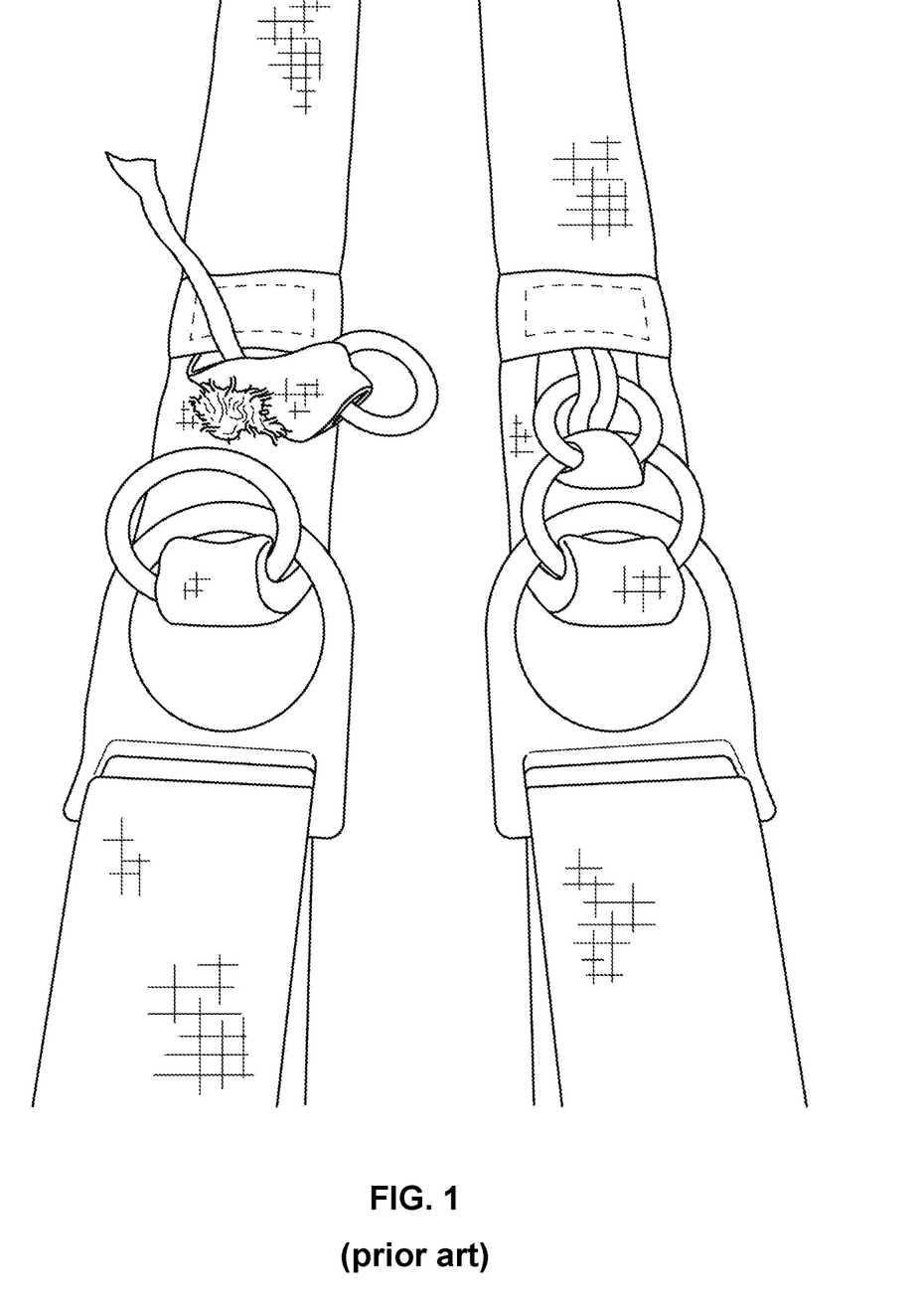
FIG. 1 illustrates a damaged prior art ring release system.
Figure 2A:
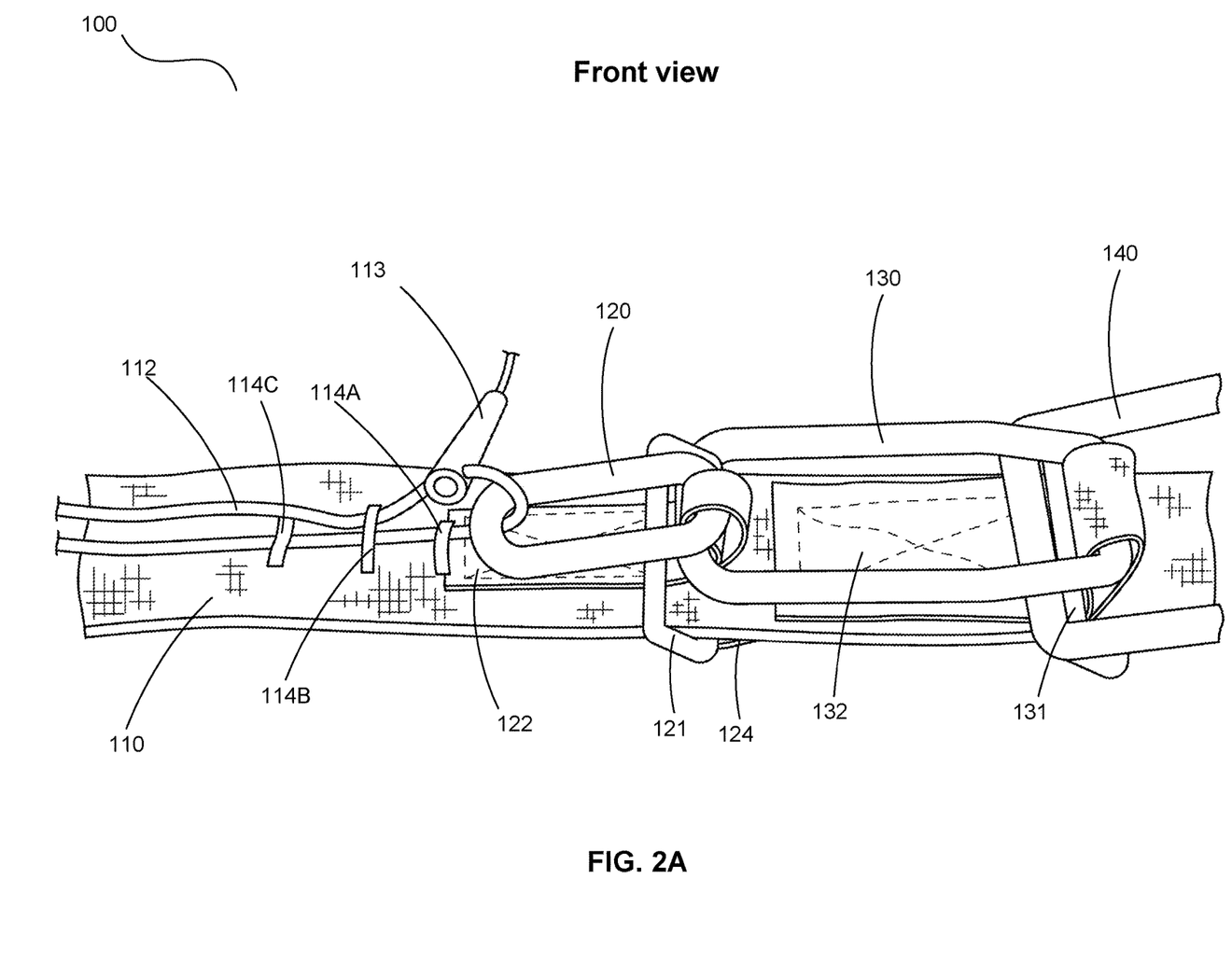
FIG. 2A illustrates a front view of certain components of an improved ring release system in accordance with various exemplary embodiments.
Figure 2B:
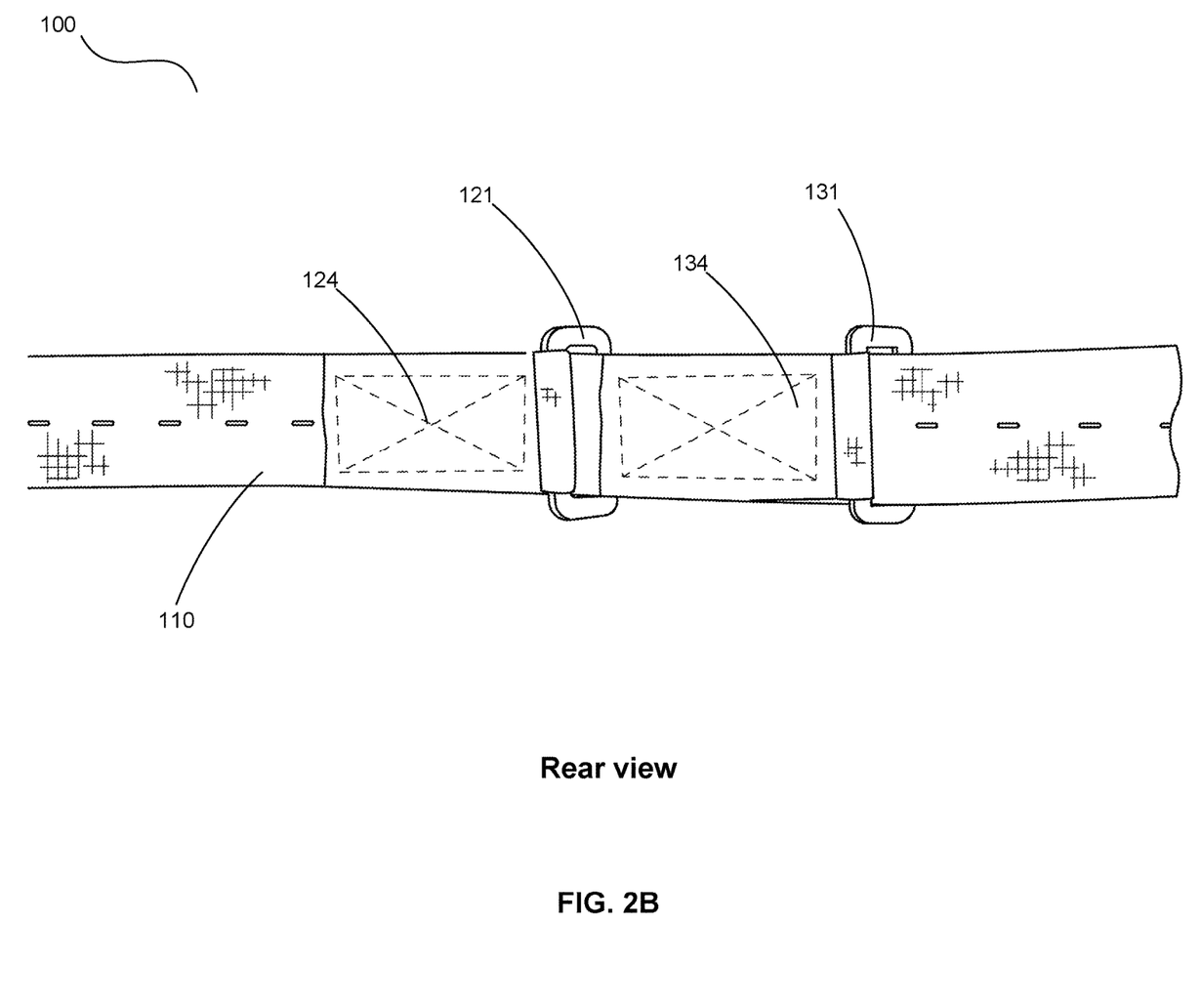
FIG. 2B illustrates a rear view of certain components of an improved ring release system in accordance with various exemplary embodiments.
Figure 3:
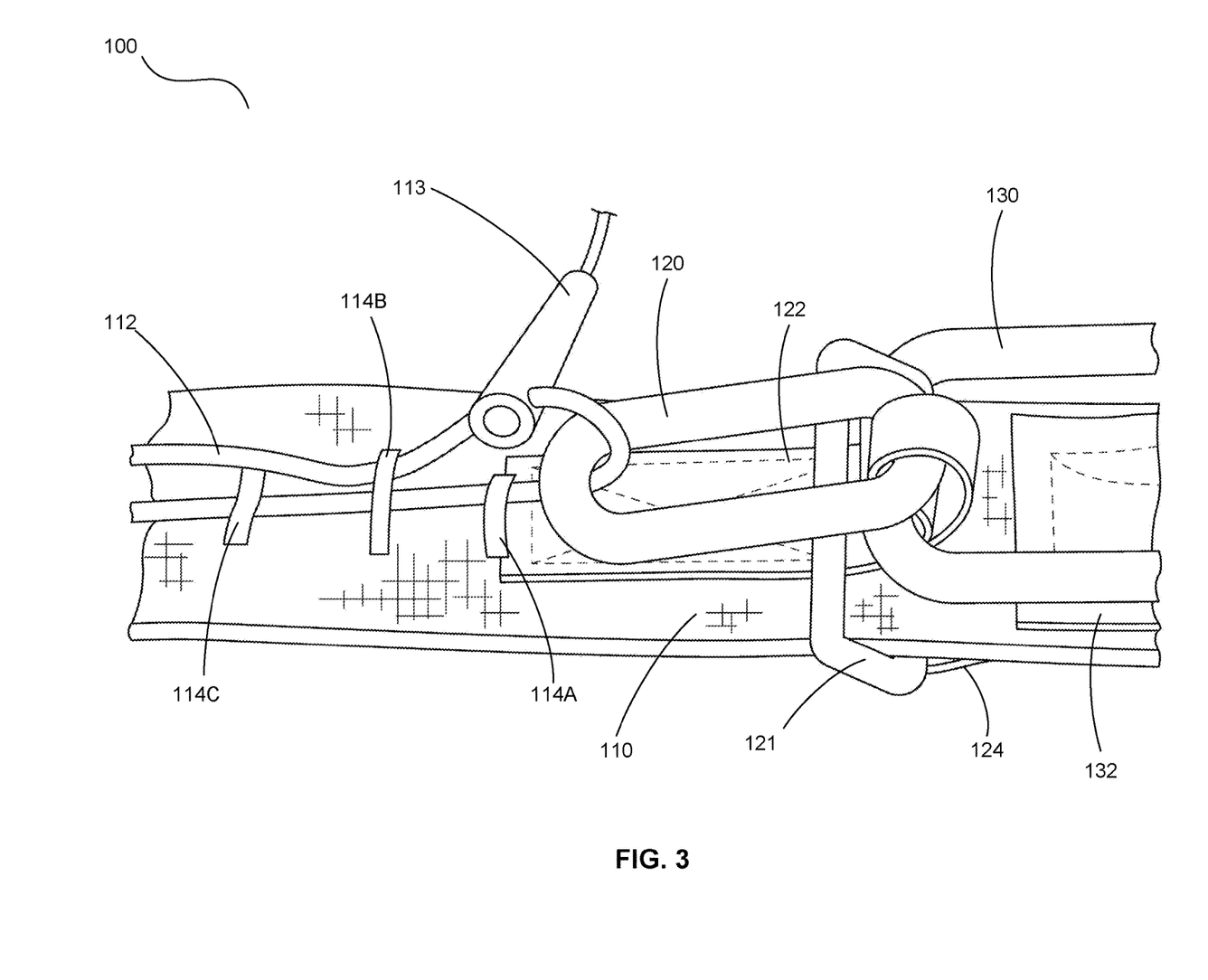
FIG. 3 illustrates certain components of an improved ring release system in a secured configuration in accordance with various exemplary embodiments.
Figure 4:
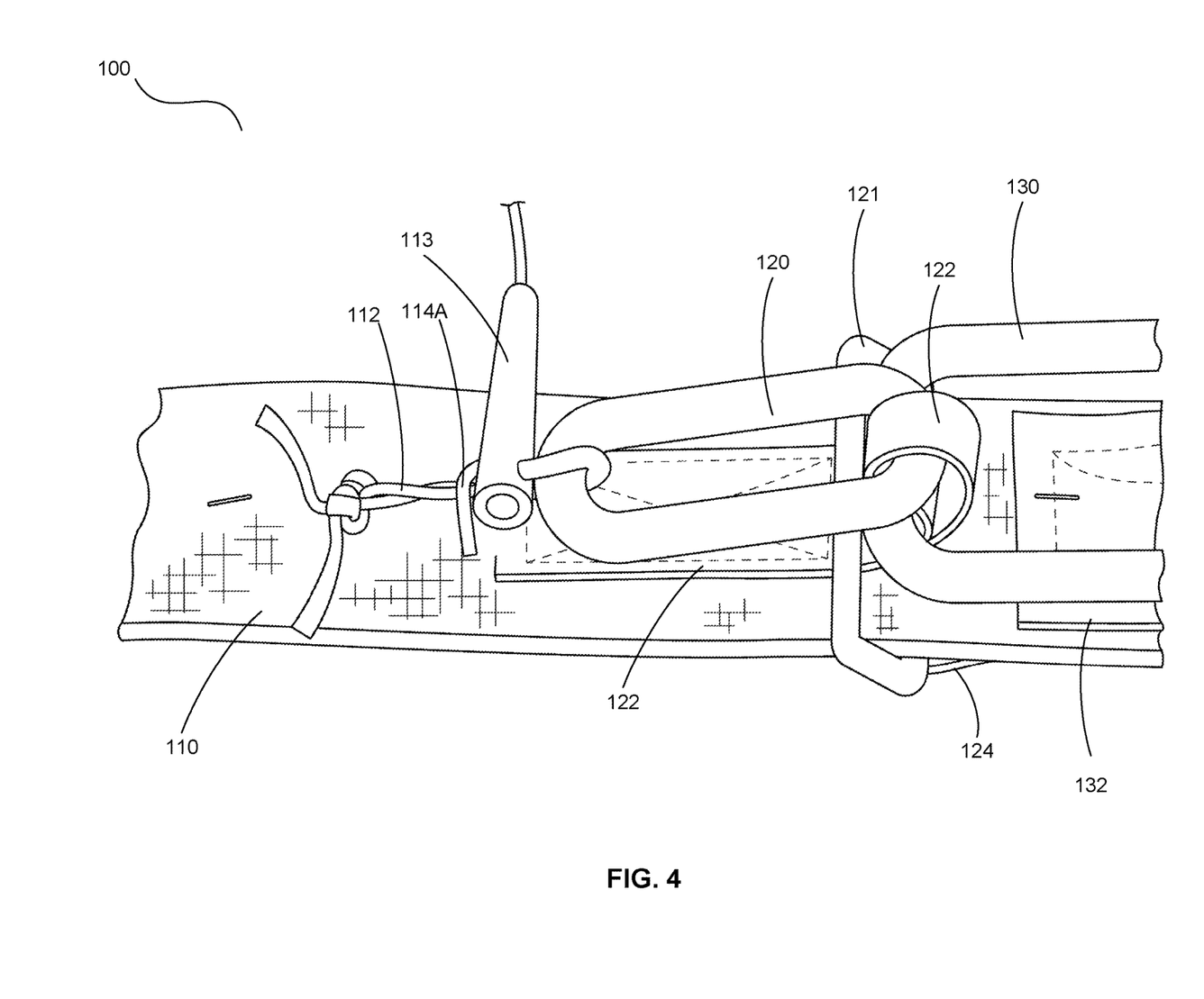
FIG. 4 illustrates certain components of an improved ring release system in a secured configuration in accordance with various exemplary embodiments.
Figure 5:
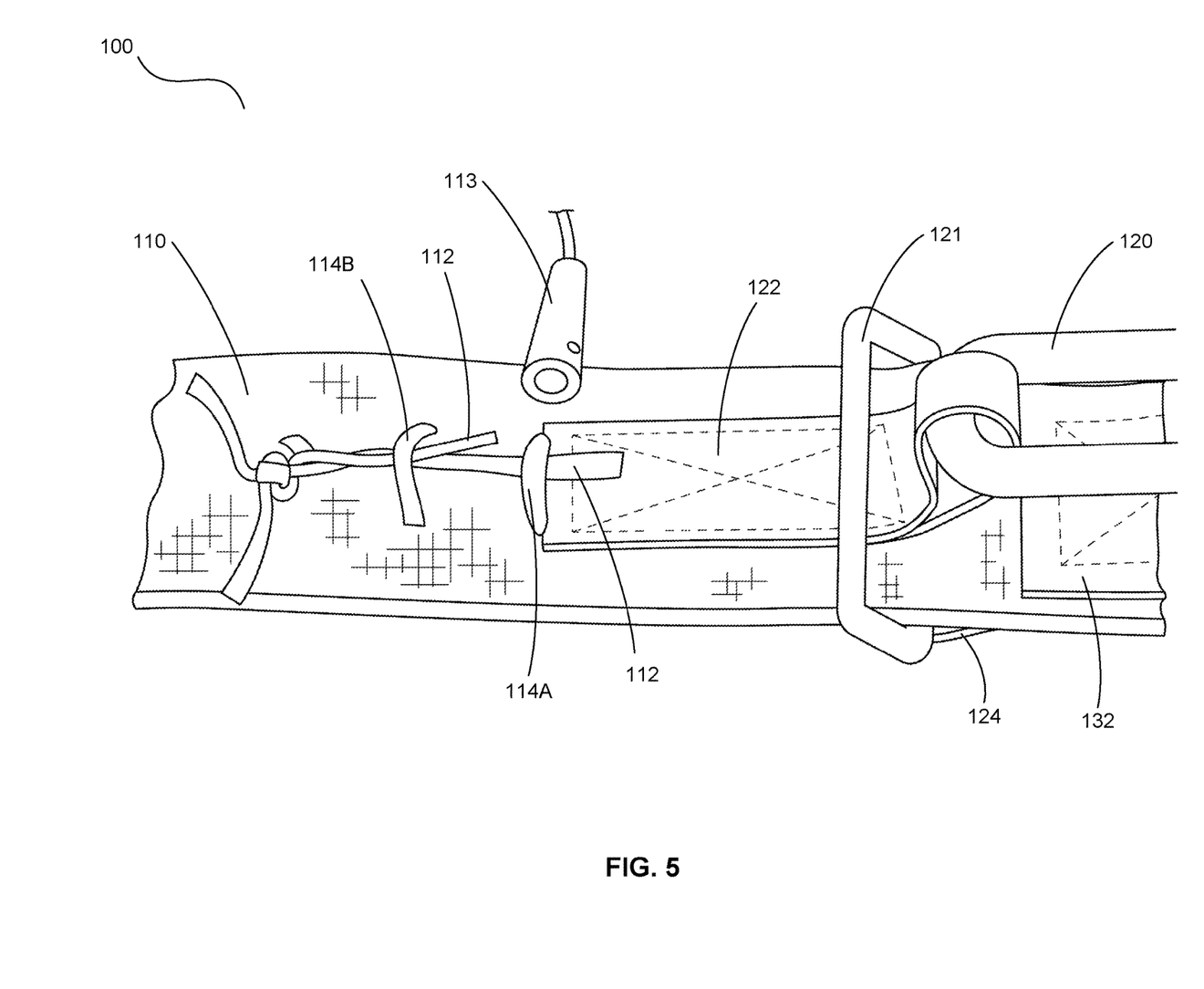
FIG. 5 illustrates certain components of an improved ring release system in a released configuration in accordance with various exemplary embodiments.

In U.S. Pat. No. 9,789,968 to Fox it is disclosed that the conventional method of attaching rings to the base webbing for a ring release device can allow the attachment stitching to be put in peel, especially if the ring release device is subjected to high tension forces. Depicted on the left side of FIG. 1 is an example of such peeled stitching in a prior art ring release device. In U.S. Pat. No. 9,789,968 it is also disclosed that a peeling force can be converted to a much stronger shearing force by utilizing cords routed through the base webbing and then sewn to the back side as a means to secure rings to the base webbing. However, it can be quite difficult to neatly route the cords, which typically have a relatively large diameter, through the base webbing if the base webbing has a tight weave. Therefore, improved attachment methods and approaches have been developed as disclosed herein.

Figure 6:
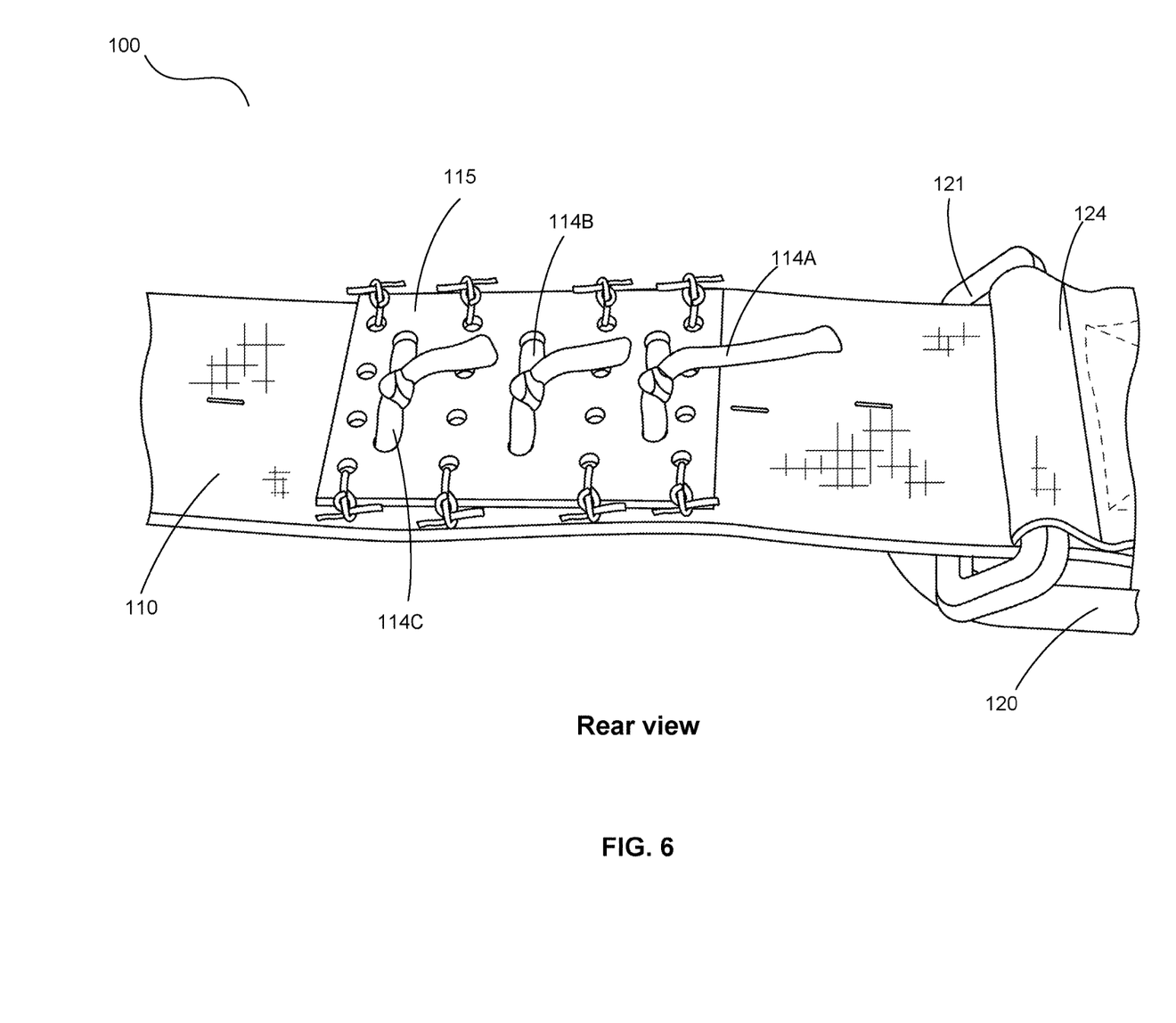
FIG. 6 illustrates a rear view of certain components of an improved ring release system in accordance with various exemplary embodiments.
Figure 7:
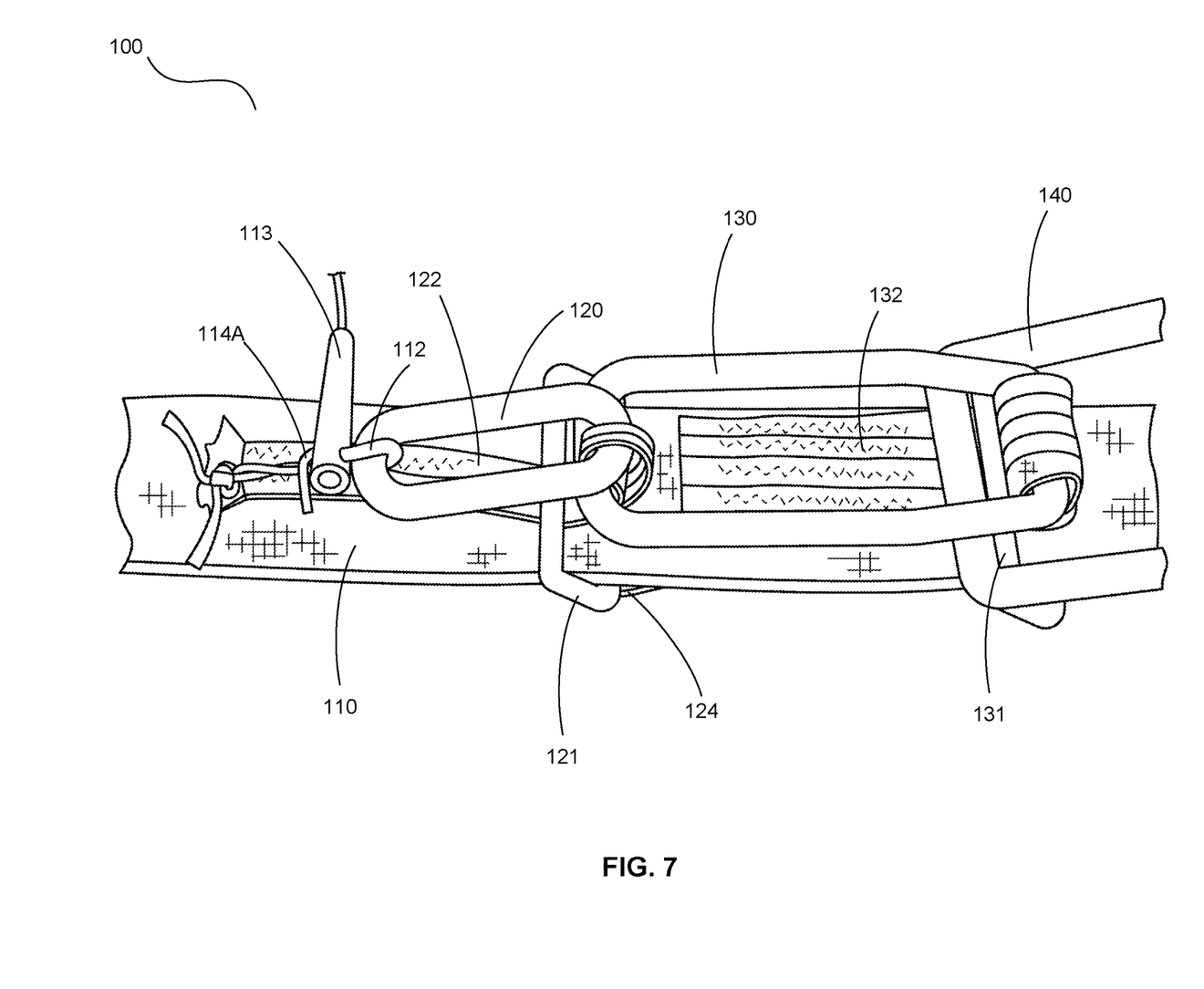
FIG. 7 illustrates certain components of an improved ring release system in a secured configuration in accordance with various exemplary embodiments.
Figure 8:
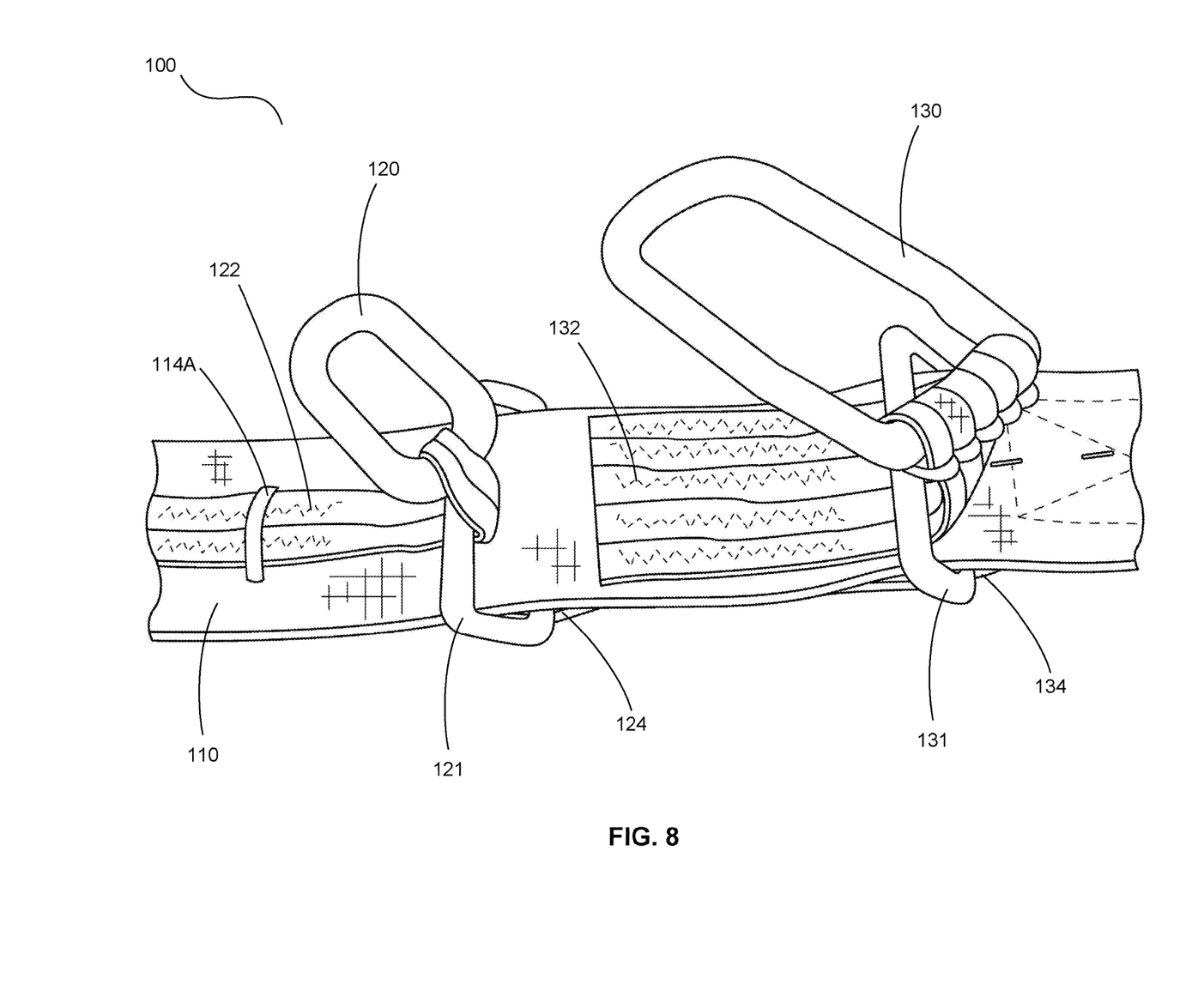
FIG. 8 illustrates certain components of an improved ring release system in a released configuration in accordance with various exemplary embodiments.
Figure 9:
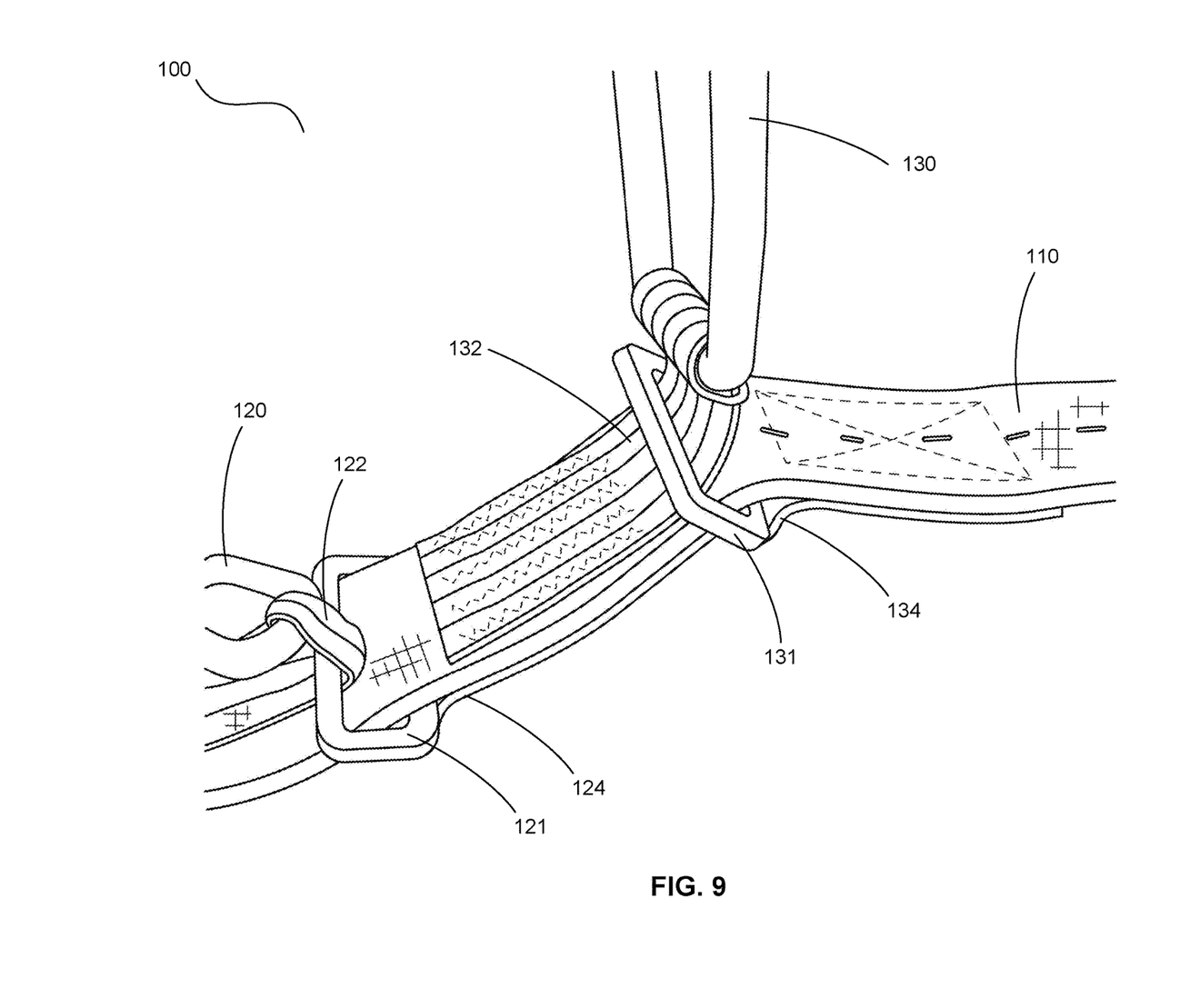
FIG. 9 illustrates certain components of an improved ring release system in a released configuration, illustrating stitching remaining in shear in accordance with various exemplary embodiments.

In various exemplary embodiments, with reference to FIGS. 2-10 it can be seen that, in various exemplary ring release systems 100 comprising an upper release ring 120, an intermediate release ring 130, and a lower release ring 140, front webbing (or front cordage) 122/132 may be stitched to the front side of a riser such as base webbing 110 after first being routed through a retaining ring 121/131 that surrounds the base webbing 110. The front stitching can still be placed in peel, however, if the retaining ring 121/131 is allowed to migrate toward the stitching that secures the attachment webbing 122/132 to the front of the base webbing 110. To prevent such migration, another webbing, such as back webbing 124/134 may be attached to the retaining ring 121/131 and sewn to the back side of the base webbing 110 to properly position and affix it. Cordage may be substituted for the front webbing 122/132, for example as illustrated in FIGS. 7, 8, and 9. If a force such as that which caused the sewing failure depicted in FIG. 1 is applied to the improved ring release system 100 disclosed herein, FIG. 9 can be helpful in visualizing that the stitches in both the front sewing (i.e., associated with front webbing 122/132) and back sewing (i.e., associated with back webbing 124/134) would be placed in shear rather than in peel.

Figure 10:
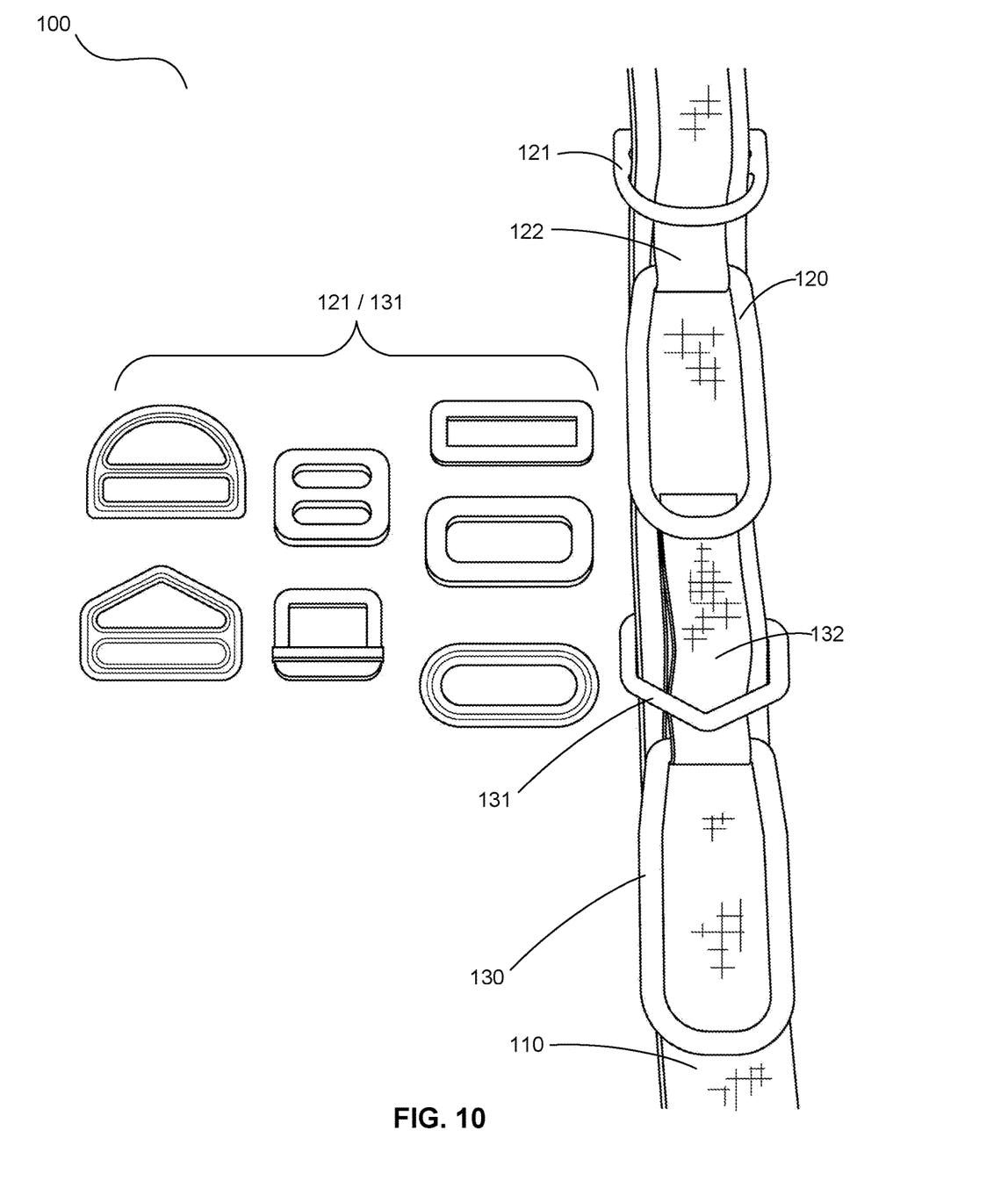
FIG. 10 illustrates exemplary retaining ring configurations of an improved ring release system in accordance with various exemplary embodiments.

Although the retaining ring 121/131 used to illustrate exemplary improved attachment methods is shown in certain Figures as rectangular, other ring shapes, such as v-rings or d-rings may be utilized. FIG. 10 illustrates various exemplary configurations of retaining ring(s) 121/131 that may be utilized. Generally, the configuration of retaining ring(s) 121/131 will be influenced by the width and/or thickness of the base webbing 110.

In addition to the foregoing improvements, principles of the present disclosure contemplate additional improvements for ring release systems. For example, in U.S. Pat. No. 9,676,487 to Fox, an exemplary locking-cord for the topmost ring is routed under a metallic keeper to hold the locking-cord somewhat close to the front of the base webbing. In contrast, as disclosed herein as part of an improved ring release system 100 and associated methods, a release mechanism such as locking cord 112 is held much closer to the base webbing 110 by cordage keeper-loops 114 (for example, cordage keeper-loops 114A, 114B, and 114C) that have been routed through the base webbing 110. Although some embodiments may utilize as few as two keeper-loops 114, three keeper-loops 114 provide a better solution. In an exemplary embodiment, keeper-loop 114A, which is closest to front webbing 122 in FIGS. 2-5, helps to hold the topmost release ring 120 close to the front of the base webbing 110 when system 100 is in a secured (i.e., pre-release) position. Also, more importantly, keeper-loop 114A prevents the topmost release ring 120 from being drawn so far toward the locking cord 112 anchor point that the relatively weak locking cord 112 and associated keeper-loop(s) 114 could be forced to share tension forces that should be borne entirely by the enormously stronger base webbing 110. The center keeper-loop 114B primarily serves to hold the locking cord 112 close to the base webbing 110, but it can also function to properly position and stabilize a retaining mechanism, such as release cutter 113 when such a cutter is part of the assembly, which is the majority of the instances when an exemplary ring release system 100 is used. Although keeper-loop 114C is superiorly used to provide an anchor point for locking cord 112 and to prevent a locking cord 112 knot from cluttering a region where release cutter 113 is located, in some embodiments keeper-loop 114C may be eliminated and the locking cord 112 may be secured to keeper-loop 114B. To properly position the keeper-loops 114A, 114B, and/or 114C and prevent them from migrating, they can be routed through a rigid plate 115 that is affixed to the back of the base webbing 110 as illustrated in FIG. 6.

Figure 11:
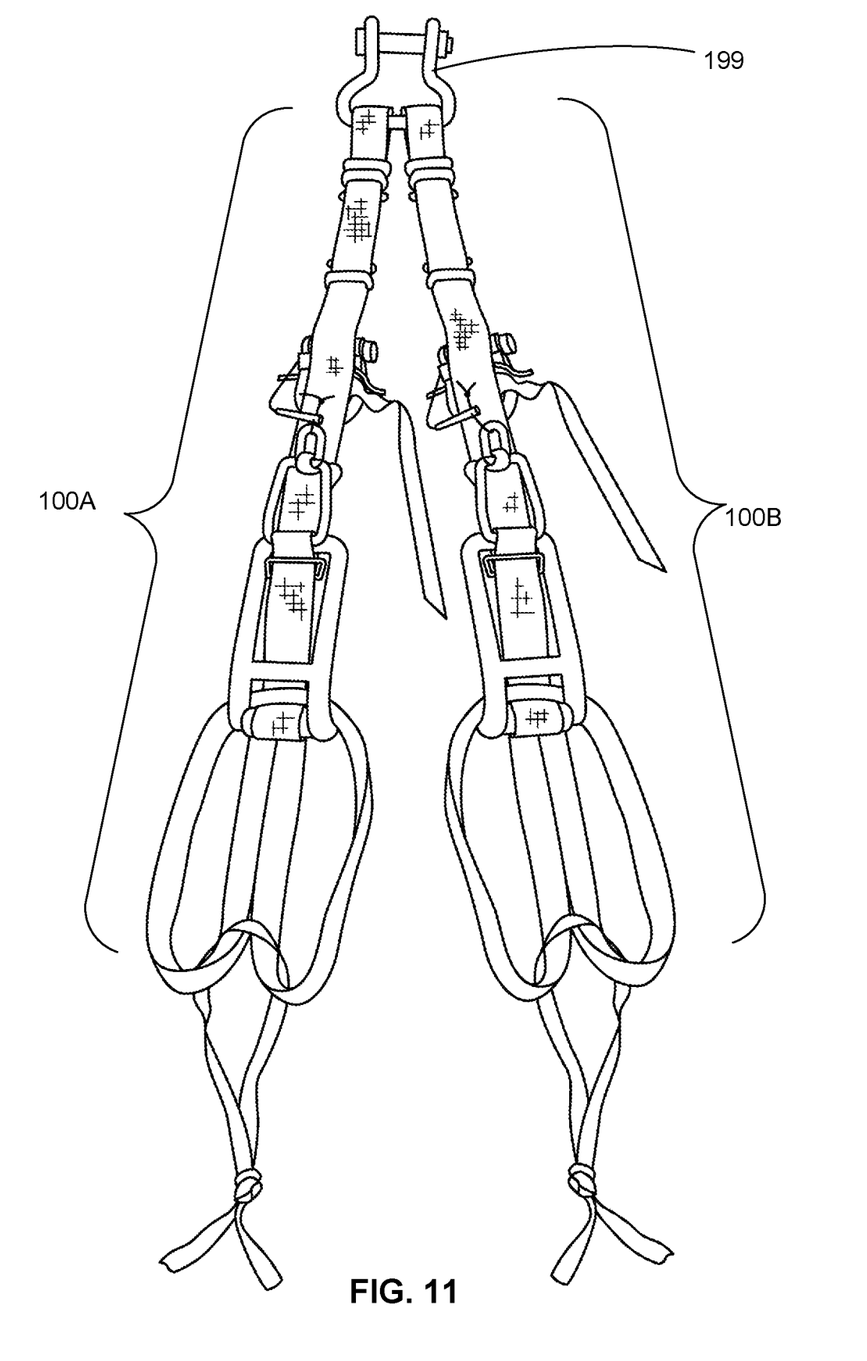
FIG. 11 illustrates a dual ring release system in accordance with an exemplary embodiment.

Turning now to FIG. 11, in various exemplary embodiments an exemplary ring release system 100 may be utilized in a dual or paired configuration, for example in order to increase a weight capacity of an overall system. In some dual configurations, a first ring release system 100A and a second ring release system 100B may be coupled to a common shackle or clevis 199 (for example, as illustrated). Moreover, in some dual configurations a stabilizing plate (not pictured) may be added which is coupled to the first ring release system 100A and to the second ring release system 100B, for example at a location near the upper portion of the base webbing 110 for each system. The stabilizing plate may be operative to ensure that the release cutters 113 of each respective ring release system 100 do not incur undesired contact with each other (or with other components of either ring release system 100) during the somewhat chaotic conditions that occur during aerial deployment and prior to activation of the release cutters 113. Additionally, a stabilizing plate may be utilized as a mounting or placement location for a release cutter initiation unit. Moreover, although a dual system is illustrated in FIG. 11, it will be appreciated that one system 100, three systems 100, four systems 100, and/or any suitable number of systems 100 may be utilized in connection with a desired size of an overall system, weight capability of an overall system, and/or the like.

Figure 12:
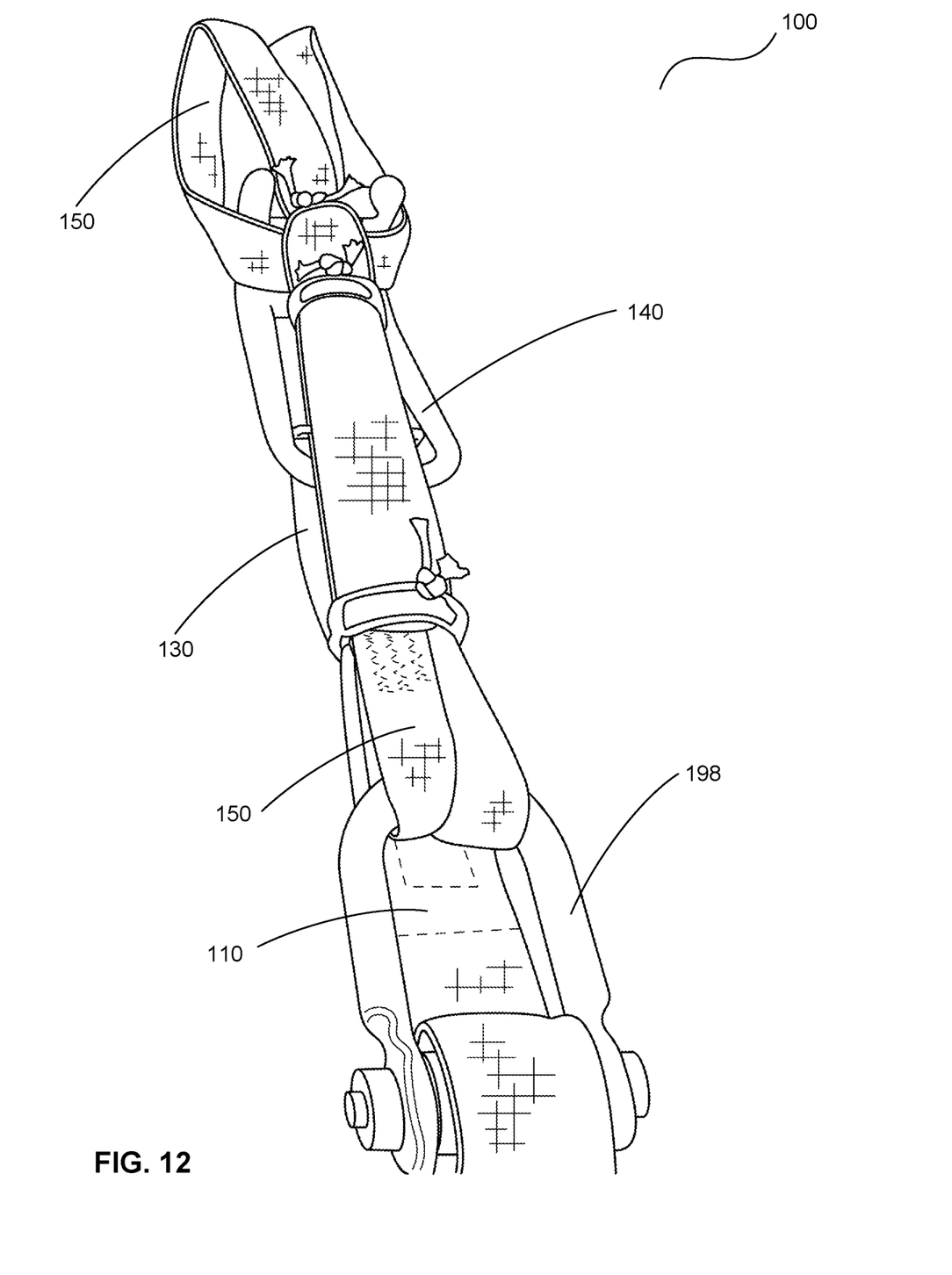
FIGS. 12 and 13 illustrate a replaceable flexible extension component of a ring release system in accordance with an exemplary embodiment.
Figure 13:
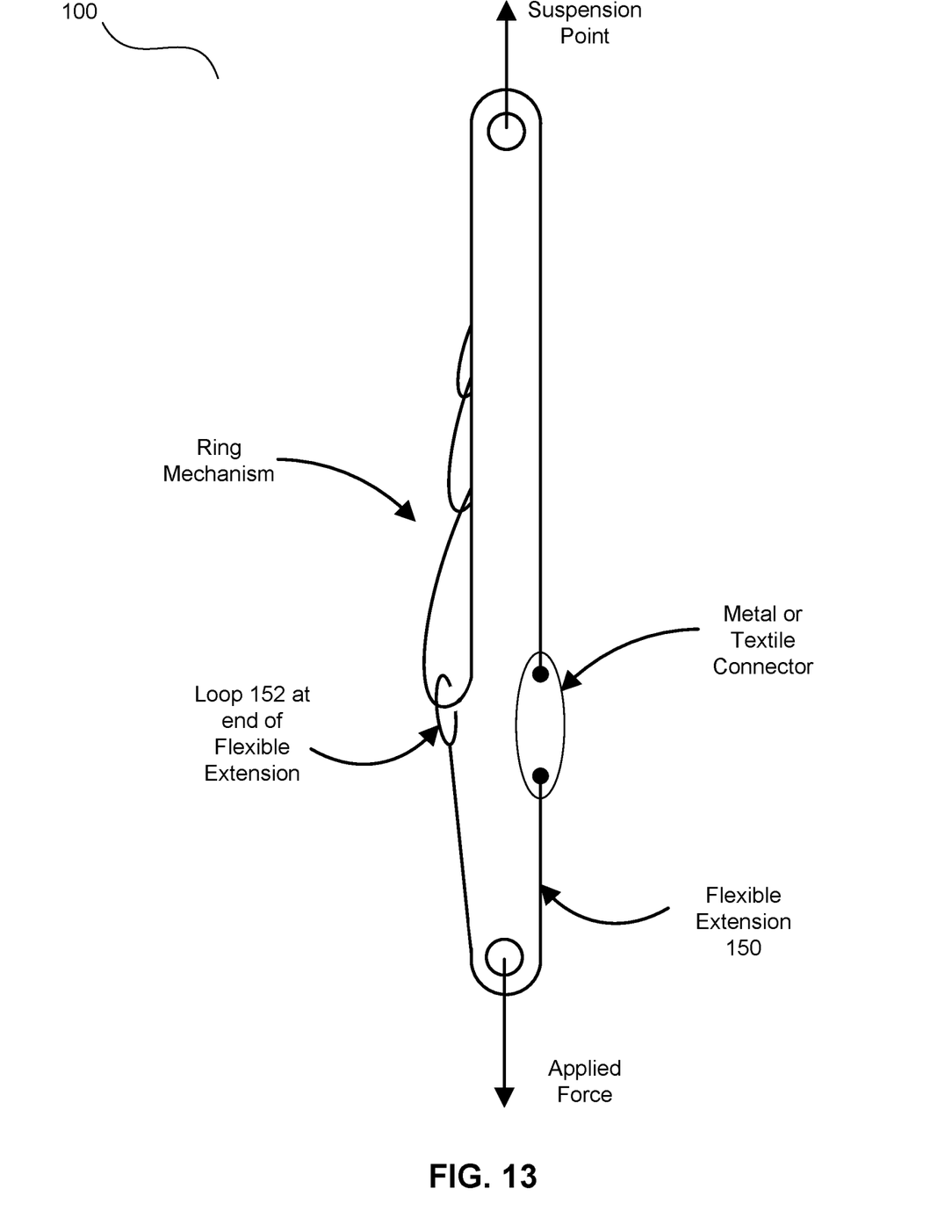

Turning now to FIGS. 12 and 13, in some exemplary embodiments components of an improved ring release system 100 may be configured to be modular, serviceable, and/or replaceable. For example, flexible extension 150 depicted in U.S. Pat. No. 9,676,487 is illustrated therein as being sewn to the back side of the primary webbing. However, flexible extension 150 (and/or corresponding loop 152 at the end thereof) are potentially exposed to significant friction induced abrasion because they slide off lower release ring 140, a J-ring, under a potentially large tension force. Because of the likelihood for abrasion damage to flexible extension 150 and/or loop 152, in various exemplary embodiments disclosed herein these components (or similar components) of a ring release system 100 may be configured as easily replaceable elements, for example as is depicted in FIG. 13. For example, when needed, a metal or textile connector may be utilized to remove a worn or damaged flexible extension 150 and to install a replacement. In FIG. 12, flexible extension 150 is shown attached to the primary structure with a steel clevis/shackle 198, thus enabling replacement of this component as needed. However, any suitable coupling and/or replacement components may be utilized, as desired.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A ring release system, comprising:
   a riser comprising webbing, the riser having a top and a bottom;
   an upper release ring coupled to the riser via a first front webbing stitched to a first side of the riser;
   a first retaining ring having the riser and the first front webbing passed therethrough, the first retaining ring being coupled to the riser via a first back webbing stitched to a second side of the riser opposite the first side; and
   an intermediate release ring coupled to the riser via a second front webbing stitched to the first side of the riser.

2. The ring release system of claim 1, further comprising a second retaining ring having the riser and the second front webbing passed therethrough, the second retaining ring being coupled to the riser via a second back webbing stitched to the second side of the riser.

3. The ring release system of claim 2, further comprising a lower release ring coupled to the riser, wherein the lower release ring is configured with a J-shape when viewed in a direction sideways to the top-to-bottom direction of the riser.

4. The ring release system of claim 1, further comprising a retaining mechanism releasably coupled to the first release ring, wherein the upper release ring and the intermediate release ring are cascadingly rotatable with respect to the riser responsive to release of the retaining mechanism.

5. The ring release system of claim 4, wherein the retaining mechanism comprises a cord loop, and wherein the cord loop is affixed to the riser via a first keeper loop, a second keeper loop, and a third keeper loop.

6. The ring release system of claim 5, wherein the first keeper loop, the second keeper loop, and the third keeper loop are routed through the riser and through a rigid plate disposed on the second side of the riser.

7. The ring release system of claim 5, wherein the first keeper loop is coupled to the riser at a location adjacent to the top of the first front webbing.

8. The ring release system of claim 5, wherein the cord loop passes through the upper release ring.

9. The ring release system of claim 5, wherein the third keeper loop is closer to the top of the riser than the second keeper loop, and wherein the second keeper loop is closer to the top of the riser than the first keeper loop.

* * * * *